Sept. 27, 1949.  F. E. BACHMAN  2,483,171
SPRING GROUP
Filed Sept. 14, 1945  2 Sheets-Sheet 1
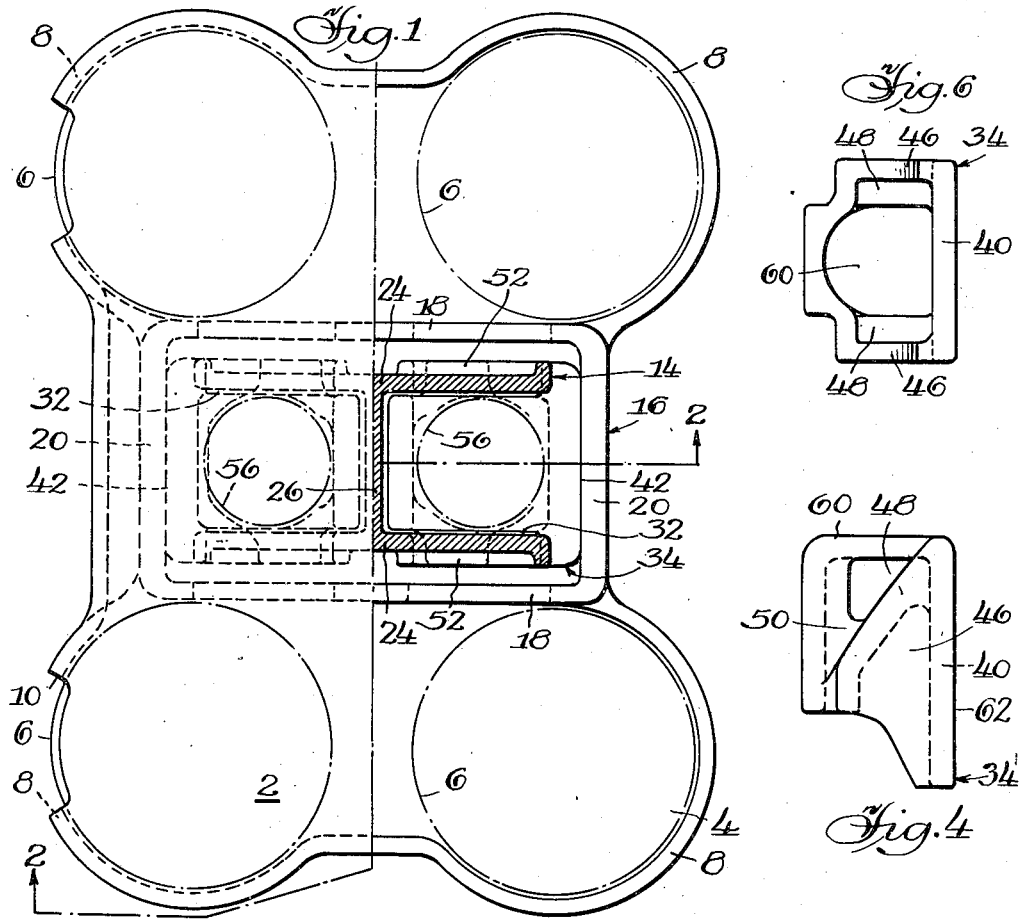
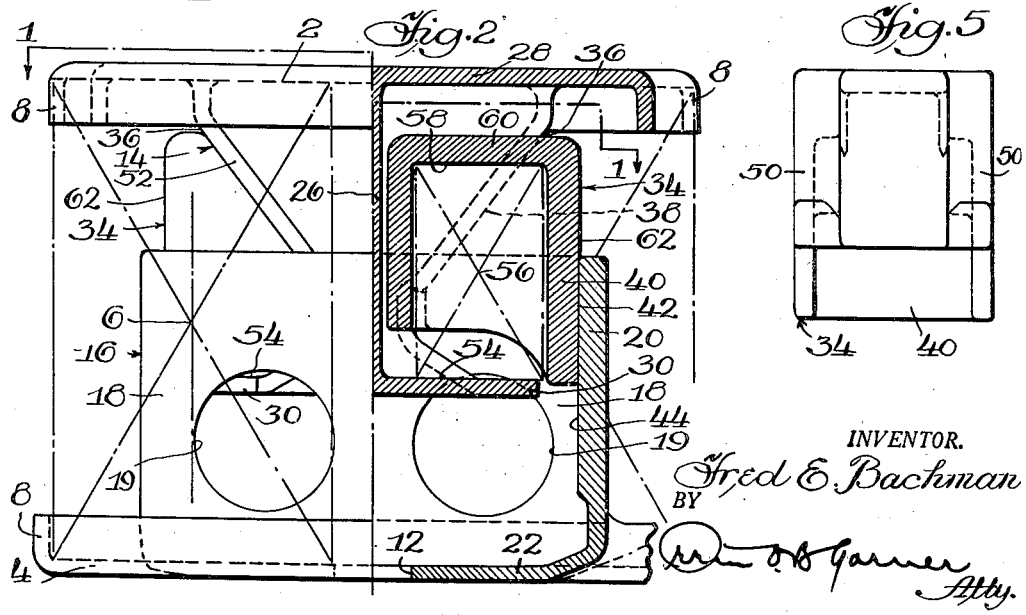
INVENTOR.
Fred E. Bachman Sept. 27, 1949.  F. E. BACHMAN  2,483,171
SPRING GROUP
Filed Sept. 14, 1945  2 Sheets-Sheet 2
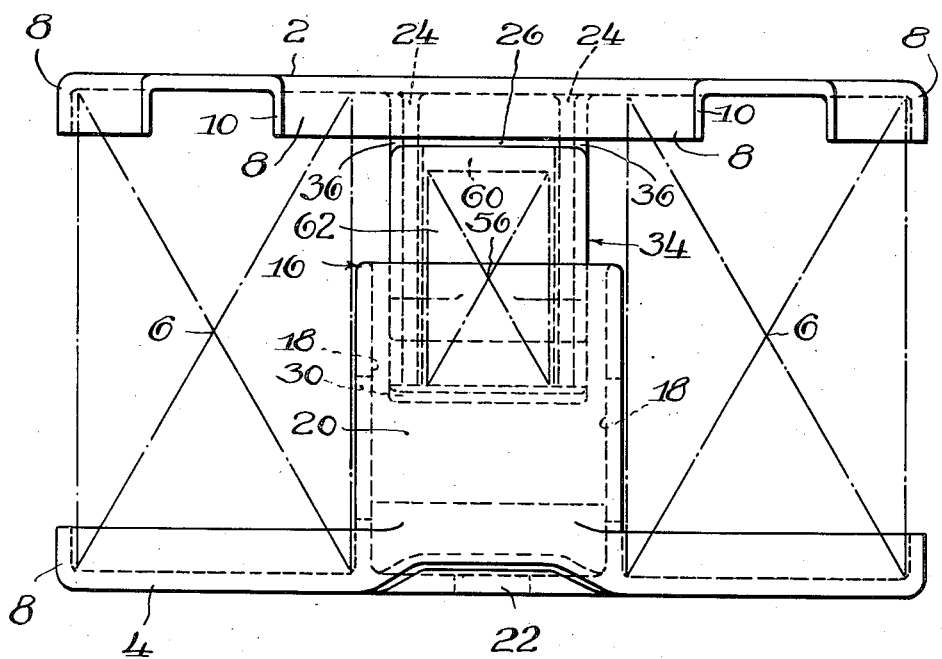
INVENTOR.
Fred E. Bachman
BY
Atty.

Patented Sept. 27, 1949

2,483,171

UNITED STATES PATENT OFFICE 2,483,171

SPRING GROUP

Fred E. Bachman, Chicago, Ill., assignor to American Steel Foundries, Chicago, Ill., a corporation of New Jersey Application September 14, 1945, Serial No. 616,266

8 Claims. (Cl. 267—9)

My invention relates to a spring group for a railway car truck and more particularly to such a structure wherein a plurality of coil springs may be utilized in conjunction with a friction absorbing device of novel form.

The general object of my invention is to devise such a group wherein the friction absorbing device will afford a satisfactory degree of control of the coil springs to prevent violent or synchronous oscillations thereof.

An object of my invention is to devise a spring group utilizing a friction absorbing device comprising spaced telescoping followers, one of said followers having friction surfaces at opposite ends thereof and the other follower having spaced wedge surfaces at each end thereof adjacent each friction surface, said device also comprising spaced friction shoes each in engagement with a friction surface and wedge surfaces at each end of respective followers and having resilient means extending between the wedge surfaces and reacting against the shoes and one of the followers for urging the shoes into said engagement.

A further object of my invention is to devise a structure such as described wherein the friction device comprises a follower in the form of a housing presenting vertical internal friction surfaces at opposite ends thereof and a wedge follower presenting spaced external diagonal friction surfaces at each end thereof tapering upwardly toward an adjacent friction surface on the housing and in complementary engagement with a friction shoe, each shoe housing resilient means extending between the diagonal friction surfaces engaged by the shoe and being compressed between the shoe and a spring seat on the wedge follower.

My invention contemplates a friction absorbing device wherein each of the resilient means or members associated with respective shoes extends between the wedge surfaces on one of the followers in engagement with the shoes and is compressed between the wedge follower and shoes to urge the shoes into frictional engagement with the other follower, whereby a substantially uniform amount of friction will be developed throughout the closure and release strokes of the device.

My invention comprehends a wedge follower of novel form comprising a top wall and spaced parallel side walls and a transverse wall connecting the side walls intermediate opposite ends thereof, said side walls having corresponding ends thereof providing at each side of the follower a pair of coplanar diagonal surfaces for engagement with an associated friction shoe, the surfaces of each pair being in spaced relationship to receive an associated coil spring therebetween for engagement with the associated shoe, the transverse wall being formed with spring seats extending laterally therefrom beneath respective pairs of diagonal surfaces for seating the shoe-actuating coil springs.

In the drawings:

Figure 1 is a top plan view of a spring group embodying my invention, partly in section, said section being taken along the line 1—1 of Figure 2;

Figure 2 is an end view, partly in section, of the structure shown in Figure 1, the section being taken along the line 2—2 of Figure 1 in a substantially transverse vertical plane bisecting the group, and Figure 3 is a side view of said structure;

Figures 4, 5 and 6 are views of my novel friction shoe, Figure 4 being a side view thereof, Figure 5 being a view thereof looking toward the right of Figure 4, and Figure 6 being a bottom view thereof.

The spring group may comprise a top spring plate 2 and a bottom spring plate 4, the marginal end portions of each of which may have a scallop-like contour in order conveniently to conform to the coil springs confined therebetween and diagrammatically indicated at 6, 6. Each of said plates may have flanges inturned as at 8, 8, said flanges being discontinuous as at 10, 10 in order to facilitate drainage or permit escape of any other included extraneous matter, and said bottom plate may have a central opening 12 therein for a similar purpose.

Centrally of the group and between the coils at opposite ends thereof may be disposed my novel form of friction device having the top follower 14 formed integral with the top spring plate 2 and the bottom follower 16 formed integral with the bottom spring plate 4. The bottom follower 16 is a rectangular box-like structure or housing having the vertical side walls 18, 18 cored away as at 19, 19, and the end walls 20, 20 merging with a horizontal bottom wall 22 merging at opposite sides thereof with and forming a portion of the spring plate 4.

The top follower 14 is a rectangular skeletal structure of less width and depth than the bottom follower 16 in order to accommodate its convenient reception between the side and end walls of the bottom follower 16, said top follower comprising spaced parallel side walls 24, 24 and a connecting vertical wall 26 merging with a horizontal top wall 28 merging at opposite sides thereof and forming a portion of the spring plate 2. The wall 26 is formed at its bottom extremity with the laterally extending walls 30, 30 merging with said side walls 24, 24 and defining therewith and the walls 26 and 28 a pocket 32 at each end of the device for receiving a friction shoe, generally designated 34. The side walls 24, 24 of the follower 16 are formed substantially triangular to provide on the remote edges or extremities a pair of spaced coplanar diagonal surfaces 36, 36 disposed entirely externally of the pocket 32 and sloping toward each of the end walls 20, 20 of the bottom follower 16, each pair of surfaces having complementary engagement as at 38 with the friction shoe 34.

Referring now to Figure 2, and also to Figures 4, 5 and 6 showing the details of each friction shoe, each of the friction shoes 34, 34 is a cuplike structure having a friction wall 40 in engagement as at 42 with a friction surface 44 on the adjacent end wall 20 of the bottom follower and having the spaced side walls 46, 46 formed to provide outwardly disposed ledges or wing portions 48, 48 presenting diagonal surfaces 50, 50 in complementary engagement with the adjacent pair of the diagonal surfaces 36, 36 on the walls 24, 24 of the top follower. To increase the bearing area of the surfaces 36, 36 of the walls 24, 24 of the top follower, each of said walls may be formed with an external outwardly projecting flange 52 to provide a substantially greater area of contact between the engaged surfaces of said shoes and said walls.

As seen in Figure 2, each of the walls 30, 30, projecting laterally from the wall 26 of the top follower affords a spring seat as at 54 for seating a coil spring diagrammatically indicated at 56 housed within the adjacent shoe 34 and extending between the engaged diagonal surfaces on the shoe and the side walls 24, 24 of the top follower for engagement as at 58 with the top wall 60 of the shoe, said springs being normally under compression between said shoes and walls 30, 30 of the top follower and being effective to urge the associated shoes upwardly along the engaged diagonal surfaces of the top follower and the friction surfaces 62 of the shoes into engagement with the friction surfaces 44 on the adjacent end walls 20 of the bottom follower.

It will be apparent from the foregoing that the springs 56, 56 will urge the friction shoes upward along the engaged diagonal surfaces of the top follower into substantially constant frictional engagement with the end walls 20, 20 of the bottom follower during the closure and release strokes of the device to thereby afford substantially constant and uniform frictional control of the oscillations of the coil springs 6, 6 of the spring group during relative vertical movement of the top and bottom spring plates in the operative position of the spring group between relatively movable supported and supporting members, for example, such as the side frame and bolster of a railway car truck.

In the assembly of the spring group, each of the shoes may have housed therein the associated spring 56 and thereafter the shoes may be positioned within the pockets 32 at opposite sides of the top follower 14 with the springs 56 seated on the walls 30, 30 of the top follower and with the diagonal surfaces 50, 50 of the shoes in engagement with the associated pair of diagonal surfaces 36, 36, whereupon a clamping piece or other suitable means may be utilized for urging the friction shoes inwardly of the top follower and downwardly along the wedge surfaces 36, 36 thereof to permit insertion of the top follower and the associated friction shoes within the bottom follower 16.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. A spring group comprising spaced top and bottom spring plates, a plurality of springs confined therebetween, friction walls carried by one of the plates, side walls vertically movable with the other plate and extending between said friction walls, a friction shoe confined between said side walls at each end thereof in guiding engagement therewith, said shoe being in wedge engagement with the extremities of said walls adjacent the associated friction wall and being in frictional engagement with said associated friction wall, and spring means extending between said side walls and bearing against said shoe at a point between said side walls for actuation of said shoe.

2. A spring group comprising spaced top and bottom spring plates, a plurality of springs confined therebetween, and a friction device in parallel with said springs comprising a hollow follower operatively engaged with one of the plates and including spaced friction surfaces, another follower operatively engaged with the other plate and comprising spaced side walls and an intervening wall, a pair of external flanges on the remote sides of respective side walls adjacent each surface and sloping therefrom to define wedge faces, a friction shoe at each end of the device housed between said side walls and adapted for frictional engagement with the related surface and for wedge engagement with the associated faces, and shoe actuating spring means supported by said intervening wall extending therefrom between said side walls and housed within the shoe for urging the latter into said engagement with the related surface and the associated faces.

3. In a spring group, spaced spring plates, a coil spring therebetween, and a friction device in parallel with said spring comprising a hollow follower integrally formed with one of the plates and including spaced internal friction surfaces, another follower integrally formed with the other plate and projecting into said hollow follower, said other follower comprising spaced side walls disposed approximately perpendicular to said surfaces, the edges of said side walls sloping toward said surface, sloping external flanges on said side walls merging with said edges, a spring seat wall connected to said side walls, and a vertical wall connected to said side walls and said spring seat wall to define a pocket adjacent each surface, said edges and said flanges defining wedge faces disposed externally of said pockets, a friction shoe in each pocket having a spring seat disposed between said side walls, having spaced ledges in complementary wedge engagement with the related faces, and having frictional engagement with the associated surface, and a compressed spring reacting against said spring seat wall and said seat.

4. A friction device comprising a hollow follower, another follower projecting into the hollow follower and comprising spaced side walls, friction surfaces within said hollow follower at the ends thereof disposed approximately perpendicular to said side walls, the edges of said side walls sloping toward said surfaces and being formed with sloping external flanges defining wedge faces, a spring seat wall connected to said side walls to define a pocket therewith adjacent each surface, a friction shoe in each pocket having a spring seat extending between said side walls, having spaced ledges in complementary wedge engagement with the related faces externally of the pocket, and having frictional engagement with the associated surface, and a compressed spring reacting against said spring seat wall and said seat, said flanges being engageable with portions of said hollow follower to limit relative lateral movement between said followers.

5. A friction device comprising a follower with friction surfaces adjacent the ends thereof, another follower projecting between said surfaces and comprising spaced side walls and an intermediate wall defining a pocket adjacent each surface, the edges of the side walls adjacent each surface sloping therefrom to afford wedge faces angularly related thereto, an external flange on the sloping edge of each side wall forming a part of the wedge face thereon, a friction shoe in each pocket confined between the associated portions of said side walls in guiding engagement therewith and having ledges projecting externally of the pocket in wedge engagement with the associated faces, a spring seat on said shoe extending between said side walls, and spring means confined between and reacting against said intermediate wall and said seat for urging the shoe against the related wedge faces and the related surface.

6. A friction device comprising a follower with friction surfaces adjacent the ends thereof, another follower projecting between said surfaces and comprising spaced side walls and an intermediate wall defining a pocket adjacent each surface, the edges of the side walls adjacent each surface sloping therefrom to afford wedge faces angularly related thereto, an external flange on the sloping edge of each side wall forming a part of the wedge face thereon, a friction shoe in each pocket confined between the associated portions of said side walls in guiding engagement therewith and having ledges projecting externally of the pocket in wedge engagement with the associated faces, a spring seat on said shoe extending between said side walls, and spring means reacting against one of said followers and against said seat for urging the shoe against the related wedge faces and the related surface.

7. A friction device comprising a follower with spaced side walls, the remote edges of each wall sloping toward each other and being externally flanged to define sloping wedge faces, friction shoe means confined between and guided by the side walls at each end of the follower, said shoe means extending externally of the space between said side walls for wedge engagement with the associated faces, a friction surface at each end of the follower relatively movable with respect thereto, and spring means carried by and reacting against said follower and operatively engaged with said shoe means for urging the latter into engagement with the associated faces and the associated surfaces.

8. In a friction device, a member including spaced substantially parallel side walls of triangular form presenting substantially coplanar diagonal edge surfaces at corresponding ends thereof, the surfaces on opposite ends of said walls converging toward the lower extremity of said member, a transverse web interconnecting said side walls and forming friction shoe pockets at opposite sides thereof with said side walls, said web being located substantially medially of the opposite ends of said walls and disposed at substantially the same angle with respect to all of said surfaces, and outwardly extending flanges on said walls adjacent each surface, each flange providing a face coplanar with the adjacent surface.

FRED E. BACHMAN.

REFERENCES CITED

The following references are of record in the file of this patent:

UNITED STATES PATENTS

| Number | Name | Date |
|---|---|---|
| 1,301,946 | Johnson | Apr. 29, 1919 |
| 1,636,435 | Priebe | July 19, 1927 |
| 2,118,006 | Couch | May 17, 1938 |
| 2,257,109 | Davidson | Sept. 30, 1941 |
| 2,378,414 | Light | June 19, 1945 |
| 2,378,415 | Light | June 19, 1945 |
| 2,398,751 | Light | Apr. 16, 1946 |